US008234293B2

(12) United States Patent
Martynov et al.

(10) Patent No.: US 8,234,293 B2
(45) Date of Patent: Jul. 31, 2012

(54) AUTOCOMPLETING WITH QUERIES TO A DATABASE

(75) Inventors: Alexander Martynov, Sammamish, WA (US); David F. Gainer, Redmond, WA (US); Howard J. Dickerman, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 380 days.

(21) Appl. No.: 11/222,928

(22) Filed: Sep. 8, 2005

(65) Prior Publication Data

US 2007/0055922 A1  Mar. 8, 2007

(51) Int. Cl.
G06F 17/30 (2006.01)
G06F 17/00 (2006.01)
G06F 17/20 (2006.01)

(52) U.S. Cl. ........ 707/767; 707/768; 707/769; 715/209; 715/210; 715/257

(58) Field of Classification Search .................. 707/534, 707/3, 5, 999.102, 999.002, 999.004, 999.001, 707/999.003, 766–769, 802, 803, 804, 809, 707/811; 365/200; 715/255–272, 230, 234, 715/484, 248, 209, 210
See application file for complete search history.

(56) References Cited

U.S. PATENT DOCUMENTS

| 5,175,810 | A | 12/1992 | Young et al. ................. 715/217 |
| 5,280,575 | A | 1/1994 | Young et al. ................. 715/255 |
| 5,319,777 | A | 6/1994 | Perez ................................. 1/1 |
| 5,845,300 | A * | 12/1998 | Comer et al. ................. 715/203 |
| 5,874,955 | A | 2/1999 | Rogowitz et al. ............. 345/589 |
| 5,880,742 | A | 3/1999 | Rao et al. |
| 5,890,174 | A | 3/1999 | Khanna et al. |
| 6,026,410 | A * | 2/2000 | Allen et al. ............................ 1/1 |
| 6,317,750 | B1 | 11/2001 | Tortolani et al. .......... 707/103 R |
| 6,366,299 | B1 | 4/2002 | Lanning et al. |
| 6,377,965 | B1 * | 4/2002 | Hachamovitch et al. ..... 715/203 |
| 6,460,059 | B1 | 10/2002 | Wisniewski .................. 715/212 |
| 6,564,213 | B1 | 5/2003 | Ortega et al. |
| 6,626,959 | B1 | 9/2003 | Moise et al. .................. 715/522 |
| 6,631,497 | B1 | 10/2003 | Jamshidi et al. .............. 715/205 |
| 6,640,234 | B1 | 10/2003 | Coffen et al. ................. 715/219 |
| 6,728,724 | B1 | 4/2004 | Megiddo et al. .............. 707/102 |
| 6,757,867 | B2 | 6/2004 | Bauchot et al. ............... 715/220 |
| 6,828,988 | B2 | 12/2004 | Hudson et al. |
| 6,829,607 | B1 * | 12/2004 | Tafoya et al. ...................... 707/6 |
| 6,907,428 | B2 | 6/2005 | Fitzpatrick et al. ............. 707/10 |

(Continued)

FOREIGN PATENT DOCUMENTS

JP  Hei 2-278323  11/1990

(Continued)

OTHER PUBLICATIONS

Office Action mailed Aug. 23, 2007, in U.S. Appl. No. 11/083,492, 12 pgs.

(Continued)

*Primary Examiner* — Jacob F Bétit
*Assistant Examiner* — Bao Tran
(74) *Attorney, Agent, or Firm* — Merchant & Gould P.C.

(57) ABSTRACT

An autocomplete method and system provides suggested completions for partial data entries based upon predefined coordinates, operands and/or commands. In one embodiment, the partial data entry may be in an active cell of a spreadsheet and the predefined coordinates may be queried from a separate, preconfigured, multi-dimensional database linked to the active cell or the spreadsheet.

14 Claims, 6 Drawing Sheets

U.S. PATENT DOCUMENTS

| | | | |
|---|---|---|---|
| 7,043,476 | B2 | 5/2006 | Robson .............................. 707/7 |
| RE39,326 | E | 10/2006 | Comer et al. |
| 7,149,970 | B1 | 12/2006 | Pratley et al. |
| 7,324,991 | B1 | 1/2008 | Anjur ............................... 707/5 |
| 7,325,194 | B2 | 1/2008 | Moore et al. |
| 7,337,163 | B1 | 2/2008 | Srinivasan et al. ................ 707/3 |
| 7,356,537 | B2 | 4/2008 | Reynar et al. |
| 7,415,481 | B2 | 8/2008 | Becker et al. ................ 707/102 |
| 7,451,397 | B2 | 11/2008 | Weber et al. |
| 7,512,580 | B2* | 3/2009 | Ronnewinkel ................. 706/52 |
| 7,603,349 | B1* | 10/2009 | Kraft et al. ............................ 1/1 |
| 7,693,860 | B2 | 4/2010 | Babanov et al. ............. 715/212 |
| 7,792,847 | B2 | 9/2010 | Dickerman et al. .......... 707/100 |
| 7,805,433 | B2 | 9/2010 | Dickerman et al. .......... 707/713 |
| 2002/0013786 | A1 | 1/2002 | Machalek ..................... 707/503 |
| 2002/0046131 | A1 | 4/2002 | Boone et al. .................... 705/26 |
| 2002/0095658 | A1 | 7/2002 | Shulman et al. |
| 2002/0118221 | A1 | 8/2002 | Hudson et al. |
| 2002/0143830 | A1 | 10/2002 | Bennett |
| 2002/0184260 | A1 | 12/2002 | Martin et al. ................. 707/503 |
| 2002/0194217 | A1 | 12/2002 | Hoffman et al. ............. 707/503 |
| 2003/0009649 | A1 | 1/2003 | Martin et al. ..................... 712/1 |
| 2003/0026143 | A1* | 2/2003 | Brennan ....................... 365/200 |
| 2003/0033288 | A1* | 2/2003 | Shanahan et al. ................. 707/3 |
| 2003/0055832 | A1 | 3/2003 | Roccaforte .................. 707/100 |
| 2003/0055843 | A1 | 3/2003 | Chiu ........................ 707/104.1 |
| 2003/0056181 | A1 | 3/2003 | Marathe |
| 2003/0191765 | A1 | 10/2003 | Bargh et al. |
| 2004/0133568 | A1 | 7/2004 | Witkowski et al. ................ 707/3 |
| 2004/0237029 | A1 | 11/2004 | Medicke et al. ............. 715/503 |
| 2005/0010565 | A1 | 1/2005 | Cushing et al. ................... 707/3 |
| 2005/0027750 | A1 | 2/2005 | Martin et al. ................. 707/200 |
| 2005/0043942 | A1* | 2/2005 | Trower et al. .................... 704/10 |
| 2005/0044497 | A1 | 2/2005 | Kotler et al. |
| 2005/0050470 | A1 | 3/2005 | Hudson et al. |
| 2005/0091206 | A1* | 4/2005 | Koukerdjinian et al. ......... 707/3 |
| 2005/0165754 | A1 | 7/2005 | Valliappan et al. ............... 707/3 |
| 2005/0165825 | A1 | 7/2005 | Turski et al. ................. 707/102 |
| 2005/0183002 | A1 | 8/2005 | Chapus ........................ 715/505 |
| 2005/0184260 | A1 | 8/2005 | Fageraas et al. ............. 250/573 |
| 2005/0223027 | A1 | 10/2005 | Lawrence et al. ......... 707/103 R |
| 2005/0223061 | A1 | 10/2005 | Auerbach et al. ............ 709/206 |
| 2006/0010367 | A1 | 1/2006 | Sattler et al. ................. 715/503 |
| 2006/0015805 | A1 | 1/2006 | Humenansky et al. ....... 715/503 |
| 2006/0069993 | A1 | 3/2006 | Jones et al. |
| 2006/0107196 | A1 | 5/2006 | Thanu et al. ................. 715/503 |
| 2006/0129598 | A1 | 6/2006 | Anjur et al. .................. 707/102 |
| 2006/0129929 | A1* | 6/2006 | Weber et al. ................. 715/538 |
| 2006/0212469 | A1 | 9/2006 | Babanov et al. ............. 707/102 |
| 2006/0224553 | A1* | 10/2006 | Chtcherbatchenko et al. ... 707/1 |
| 2006/0248078 | A1* | 11/2006 | Gross et al. ........................ 707/7 |
| 2006/0282575 | A1* | 12/2006 | Schultz et al. ................... 710/62 |
| 2006/0293944 | A1 | 12/2006 | Igelbrink et al. ................. 705/9 |
| 2007/0027876 | A1 | 2/2007 | Graf ................................ 707/10 |
| 2007/0027904 | A1 | 2/2007 | Chow et al. .................. 707/102 |
| 2007/0033516 | A1* | 2/2007 | Khosla et al. .............. 715/501.1 |
| 2007/0050702 | A1 | 3/2007 | Chopin et al. ................ 715/507 |
| 2007/0055922 | A1 | 3/2007 | Martynov et al. ............ 715/210 |
| 2007/0061344 | A1 | 3/2007 | Dickerman et al. .......... 707/100 |
| 2007/0088691 | A1 | 4/2007 | Dickerman et al. .............. 707/5 |
| 2007/0168323 | A1 | 7/2007 | Dickerman et al. .............. 707/2 |
| 2007/0208721 | A1 | 9/2007 | Zaman et al. ..................... 707/4 |
| 2007/0219956 | A1 | 9/2007 | Milton .............................. 707/3 |
| 2008/0294612 | A1 | 11/2008 | Wiles ............................... 707/4 |
| 2010/0312748 | A1 | 12/2010 | Dickerman et al. .......... 707/713 |

FOREIGN PATENT DOCUMENTS

| | | |
|---|---|---|
| JP | Hei 5-151259 | 6/1993 |
| JP | 2000-029451 | 1/2000 |
| JP | 2002-150209 | 5/2002 |
| KR | 10-0289065 B1 | 5/1999 |
| KR | 100289065 | 5/1999 |
| TW | 508508 | 11/2002 |
| WO | WO 03/088063 | 10/2003 |

OTHER PUBLICATIONS

Office Action mailed Oct. 10, 2007, in U.S. Appl. No. 11/268,048, 16 pgs.
Office Action mailed Jan. 18, 2008, in U.S. Appl. No. 11/251,598, 17 pgs.
Office Action mailed Feb. 19, 2008, in U.S. Appl. No. 11/325,372, 14 pgs.
Office Action mailed Feb. 21, 2008, in U.S. Appl. No. 11/083,492, 13 pgs.
Office Action mailed Jul. 22, 2008, in U.S. Appl. No. 11/268,048, 19 pgs.
Office Action mailed Jul. 24, 2008, in U.S. Appl. No. 11/083,492, 16 pgs.
Final Office Action mailed Oct. 15, 2008, in U.S. Appl. No. 11/251,598, 13 pgs.
Final Office Action mailed Nov. 12, 2008, in U.S. Appl. No. 11/325,372, 10 pgs.
Office Action mailed Jan. 6, 2009, in U.S. Appl. No. 11/083,492, 17 pgs.
Office Action mailed Feb. 24, 2009, in U.S. Appl. No. 11/268,048, 18 pgs.
Office Action mailed Jul. 8, 2009, in U.S. Appl. No. 11/251,598, 15 pgs.
Office Action mailed Jul. 13, 2009, in U.S. Appl. No. 11/325,372, 12 pgs.
Final Office Action mailed Sep. 23, 2009, in U.S. Appl. No. 11/268,048, 21 pgs.
Final Office Action mailed Feb. 1, 2010, in U.S. Appl. No. 11/325,372, 20 pgs.
Final Office Action mailed Feb. 19, 2010, in U.S. Appl. No. 11/251,598, 28 pgs.
Office Action mailed Mar. 1, 2010, in U.S. Appl No. 11/268,048, 19 pgs.
International Search Report mailed Sep. 26, 2003, in PCT/IB03/01444, 1 pg.
"Tutorial 26: MSAS: Office 2000 OLAP Components", http://www.exforsys.com/content/view/1349, last accessed Sep. 8, 2005, 7 pgs.
"What is XLCubed Explorer", http://www.xlcubed.com/explorer.htm, last accessed Sep. 8, 2005, 2 pgs.
"Excel Simplicity. Advanced OLAP Capabilities. Web Enabled.", http://paristech.com/index2.html, Sep. 8, 2005, 3 pgs.
"SPSS Base", http://www.spss-sa.com/products/body.htm, last accessed Sep. 8, 2005, 12 pgs.
Office Action mailed Aug. 24, 2010, in U.S. Appl. No. 11/325,372, 21 pgs.
International Search Report and Written Opinion mailed Feb. 26, 2007 in PCT/US2006/034987, 10 pages.
International Search Report mailed Sep. 26, 2003, in PCT/IB03/01444, 1 page.
USPTO Final Office Action cited in U.S. Appl. No. 12/852,235, mailed May 11, 2011; 25 pages.
Office Action mailed Nov. 24, 2010, in U.S. Appl. No. 12/852,235.
Office Action mailed Feb. 9, 2011, in U.S. Appl. No. 11/325,372, 19 pgs.
Chinese Patent Office Notice on Second Office Action cited in Application No. 200680032796.2, dated Dec. 31, 2011 (in Chinese with English translation attached); 6 pages.
Australian Notice of Allowance in Application 2005225040, mailed Jul. 5, 2010, 3 pgs.
Australian Office Action in Application 2005225040, mailed May 7, 2010, 2 pgs.
Chinese 1st Office Action in Application 20051012502859, mailed Oct. 31, 2008, 11 pgs.
Chinese 2nd Office Action in Application 20051012502859, mailed Apr. 17, 2009, 12 pgs.
Chinese Notice of Allowance in Application 20051012502859, mailed Sep. 18, 2009, 4 pgs.
Chinese Office Action cited in Appl. No. 200680032796.2 dated Feb. 12, 2010, 7 pgs.
European Extended Search Report in Application 05111321.5, mailed May 11, 2009, 6 pgs.

European Office Action in Application 051113215, mailed Nov. 25, 2009, 4 pgs.
Japanese 2nd Notice of Rejection in Application 2005339028, mailed Aug. 26, 2011, 6 pgs.
Japanese Notice of Rejection in Application 2005339028, mailed Jan. 21, 2011, 6 pgs.
Malaysian Notice of Allowance in Application PI20055334, mailed Dec. 30, 2011, 2 pgs.
Notice of Allowance mailed Aug. 23, 2010 in U.S. Appl. No. 11/251,598, 2 pgs.
Notice of Allowance mailed Jul. 2, 2010 in U.S. Appl. No. 11/251,598, 16 pgs.
Notice of Allowance mailed Jul. 6, 2009 in U.S. Appl. No. 11/083,492, 12 pgs.
Notice of Allowance mailed Jun. 30, 2010, in U.S. Appl. No. 11/268,048, 8 pgs.
Notice of Allowance mailed Nov. 2, 2009 in U.S. Appl. No. 11/083,492, 12 pgs.
Office Action mailed Dec. 7, 2011, in U.S. Appl. No. 12/852,235, 26 pgs.
Russian Notice of Allowance in Application 2005135427, mailed Jun. 4, 2010, 6 pgs.
Tanaka, Rabo, "Microsoft Visual C++ 6.0: The Integrated Development Environment with Enhanced Programming Assistance," C Magazine, vol. 10, No. 12, pp. 160-163, Softback Corp., Dec. 1, 1998 (no English translation).
U.S. Appl. No. 11/012,964, Office Action mailed Nov. 13, 2006, 25 pgs.
U.S. Appl. No. 11/012,964, Office Action mailed May 1, 2007, 23 pgs.
U.S. Appl. No. 11/012,964, Advisory Action mailed Jul. 18, 2007, 3 pgs.
U.S. Appl. No. 11/012,964, Office Action mailed Jan. 7, 2008, 25 pgs.
U.S. Appl. No. 11/012,964, Notice of Allowance mailed Aug. 1, 2008, 11 pgs.
Computer Training and Support Services, Academic Computing & Networking, "Excel 2000 Part 1", 2000, pp. 1-6, Available: http://www.colostate.edu/Services/ACNS/standards/office/excel/excel2000P I.doc.
Valle, Araceli et al., "How to Simplify Writing Evaluations Using Excel and MailMerge", Mar. 19, 2002, pp. 1-8.
Chinese Notice of Allowance in Application 200680032796.2, mailed Mar. 22, 2012, 3 pgs.
Korean Notice of Preliminary Rejection in Application 10-20050101116, mailed May 3, 2012, 3 pgs.
Taiwanese Search Report in Application 094136232, mailed Mar. 17, 2012, 1 page.

* cited by examiner

AUTOCOMPLETING WITH QUERIES TO A DATABASE

BACKGROUND

Automatically completing spreadsheet entries is a useful tool, particularly for large data entry projects where a user is tasked with entering duplicative data. For example, a user may be required to repeatedly enter the same word or phrase within a column of a spreadsheet, and the "autocomplete" function found in many spreadsheets programs simplifies this task by providing suggestions for completed entries as a user stars to enter data within a spreadsheet cell.

While spreadsheets may be used to present data from many different sources, the autocomplete function has typically been limited to providing suggestions for data entries found within the current spreadsheet. Thus, when a user attempts to address data sources separate from the spreadsheet, such as linking to an entry within a separate database, the user is not prompted with any autocomplete suggestions for the various data locations within the database. This problem may be compounded by the fact that the user is not familiar with the layout or configuration of the database, as well as the fact that the format or syntax of the database may not be intuitive to the user. For example, the user may not know the predefined dimensional labels for a particular database, or the data sources may use complex and non-intuitive command or programming languages. Furthermore, even if a user is familiar with the underlying database structure and syntax, the user will still be required to manually input long strings (i.e., addresses within the database) when linking data from the database within the spreadsheet. Any typographical error or mistake in the syntax of a database label or command will produce an error in the resulting spreadsheet. It is with respect to these and other considerations that the subject of the present disclosure has been made.

SUMMARY

Exemplary embodiments disclosed herein may include a method and system for alleviating the disadvantages noted above, as well as others. Exemplary embodiments disclosed herein may include a method and system for autocompleting entries in an active cell of a spreadsheet from a separate multidimensional database.

Other embodiments may include a method for autocompleting data entries, including accessing a predefined data source, activating the edit mode for an application, determining a partial data entry in the application, and displaying a list of corresponding data labels based upon the partial entry in the application.

Methods and systems described herein may be implemented as a computer process, a computing system, or as an article of manufacture, such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

DETAILED DESCRIPTION

Figure 1:
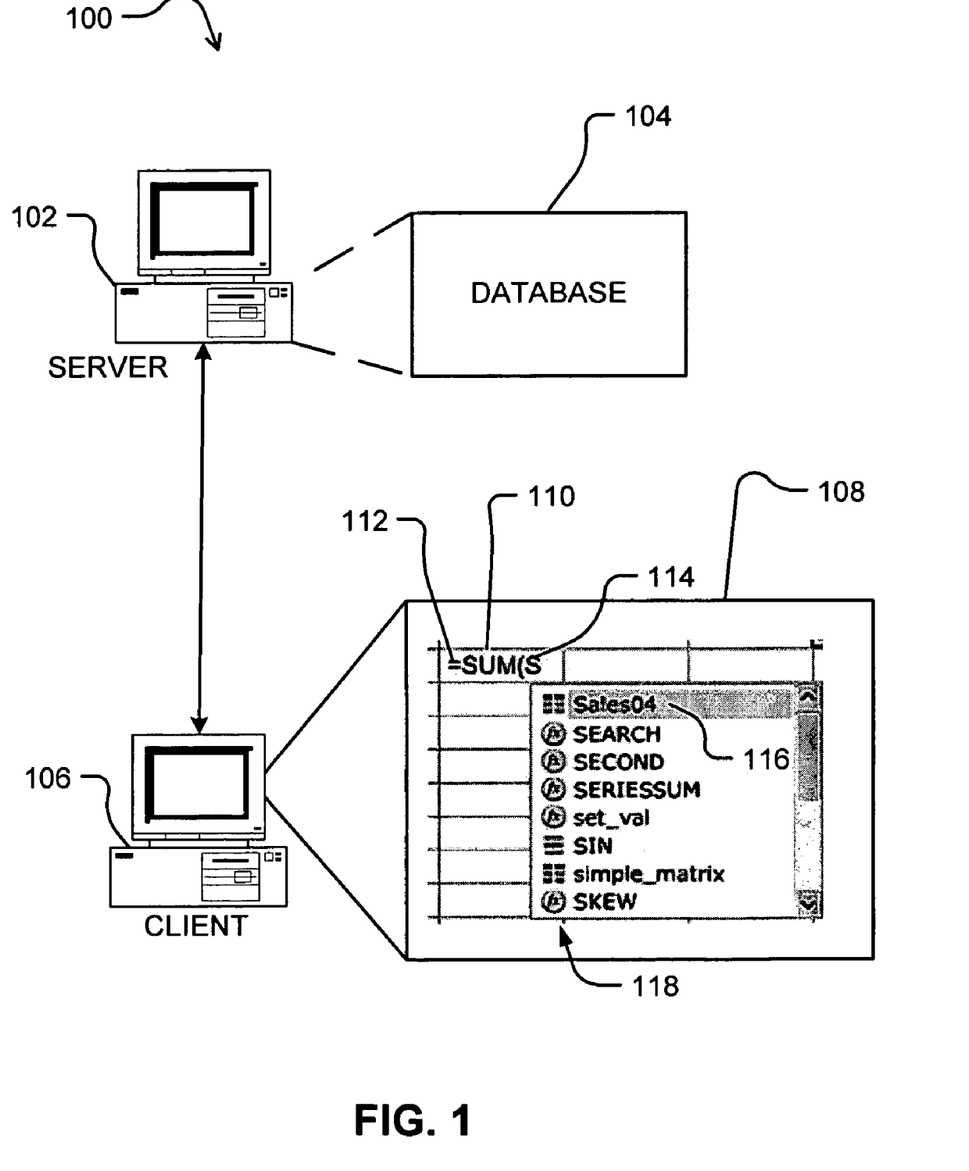
FIG. 1 illustrates a system for autocompleting entries from a database according to an exemplary embodiment.

A system 100 for automatically completing ("autocompleting") entries in an active cell of a spreadsheet according to an exemplary embodiment is shown in FIG. 1. In this embodiment, system 100 includes a server 102, which in turn includes a data source or database 104. Server 102 is communicationally coupled to client 106. Client 106 includes a spreadsheet application 108. Spreadsheet application 108 includes an active cell 110, which is highlighted by the dark border around the particular active cell 110. Within active cell 110 is partial data entry 114. In this embodiment, partial data entry 114 includes operand 112. Based upon the partial data entry 114, elements 116 are shown.

Elements 116 include data labels/coordinates from database 104 which is coupled to server 106 and correspondingly coupled to the client 106 and the spreadsheet application 108. Furthermore, elements 116 may be functions or other commands that are appropriate for the particular type of database being utilized, or for the type of spreadsheet being created. Database 104 may be queried to suggest completed entries for the active cell 110, based at least in part upon partial data entry 114.

Database 104 is typically a multi-dimensional and/or online analytical processing or "OLAP" database. Database 104 may be a "cube" database, which may be a portion of a larger, related database. If database 104 is an OLAP type database, the coordinates of that database may be described as dimension, hierarchy, member, or coordinate of the multi-dimensional database. Database 104 is separate from spreadsheet 108. Indicators 118 may also be included with the suggested elements 116. Indicators 118 may indicate what type of element the suggested elements are, namely, a function, a dimension, hierarchy, member, etc. This may assist the user in determining which suggested element to choose. With this system, a user may not need to know the data labels, functions, commands and/or dimensions of a database that is linked to the current spreadsheet to enter data labels.

Communication between the spreadsheet application and the data source may be accomplished with multidimensional expression language, or MDX. It will be appreciated that other data sources, such as other types of databases, tables, pivot tables, etc. may be utilized without straying from the concepts disclosed herein. Additionally, other command languages or protocols, such as sequential query language (SQL) or other database query languages, may be utilized within the scope of the present invention. Furthermore, although the application is described herein as a spreadsheet, it will be appreciated that other applications, such word processing applications, as well as other applications, may utilize this autocomplete methodology and/or system.

Elements 116 may include all possible functions and coordinates where partial data entry 114 is merely an operand and/or no character entry. Elements 116 may include all available data labels in database 104, as well as other commands and/or operands. In an embodiment, once a character is entered into partial data entry 114 within active cell 110, data labels 116 will include labels that start with the particular character that has been entered or commands that may be appropriate based upon the character(s) entered in the active cell 110. It will also be appreciated that once another character is typed into the active cell 110, the displayed labels 116 may change and/or may be reduced in number.

As the user enters each keystroke, special queries may be created and sent to an external server to fetch one or more elements from the database that correspond to the partial data entry. In the case of a multi-dimensional database, the queries that are sent as well as the elements that are returned may be MDX expressions. The MDX expressions that are returned from the database can be used to build more complex MDX expressions that may eventually be used as part of a larger argument for the spreadsheet function, such as a Microsoft® Excel® Cube function, pivot table, other table, etc. A displayed list may be an autocomplete drop-down list, which permits the user to select an item from the list or continue entering characters. Of course, any time new characters are entered, a new query may be executed.

With system 100, users need not know the particular data labels or elements within a database since they may search for the appropriate data label. This will save time and frustration for the user since the particular data labels may be autocompleted from a list of pre-defined data labels, thereby reducing mistakes and the time required for spreadsheet configuration.

Figure 2:
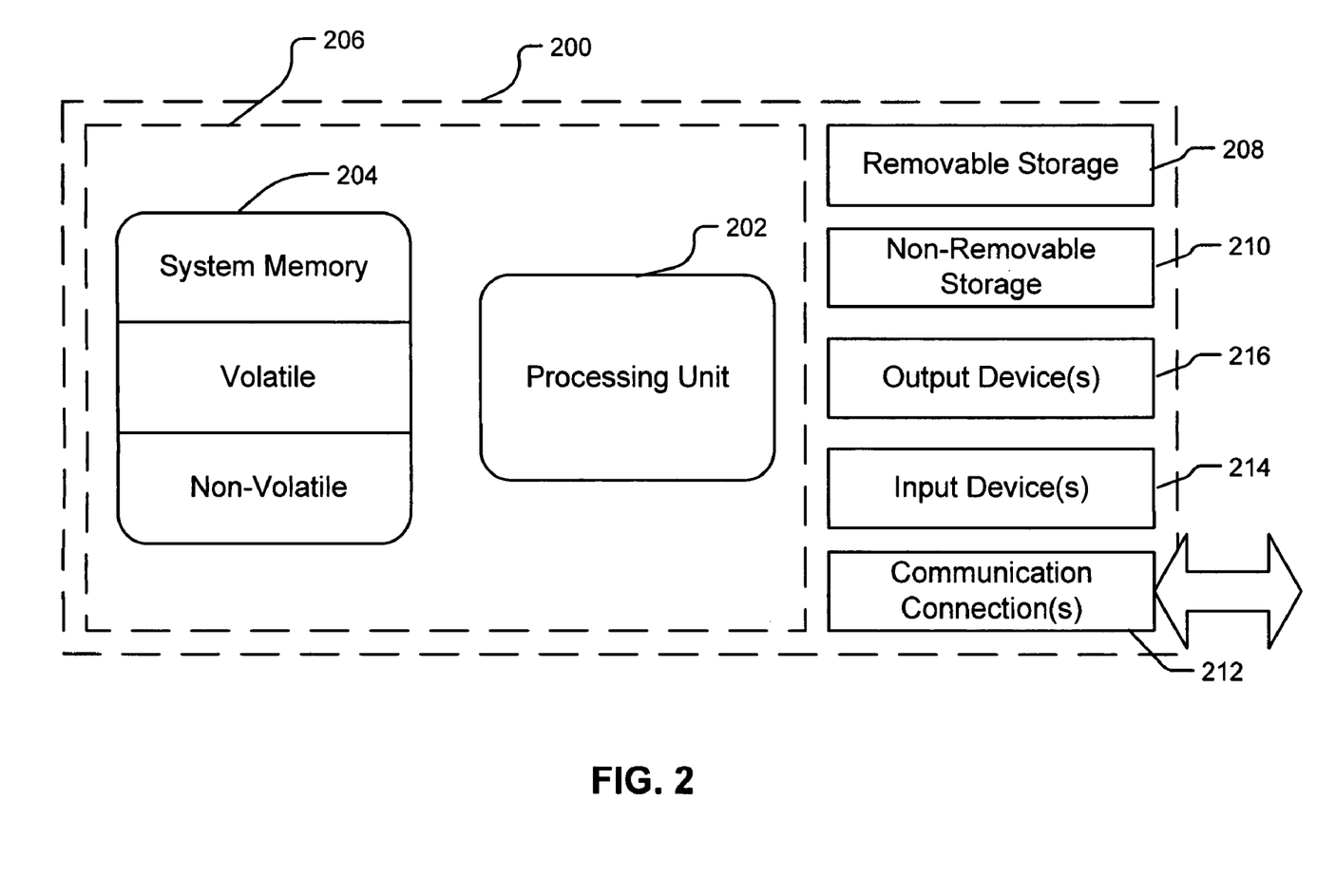
FIG. 2 illustrates an example of a suitable computing system environment on which exemplary embodiments may be implemented.

FIG. 2 illustrates an example of a suitable computing system environment 200 on which embodiments of the invention may be implemented. In its most basic configuration, system 200 typically includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206. Additionally, system 200 may also have additional features/functionality. For example, system 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 200. Any such computer storage media may be part of system 200.

System 200 may also contain communications connection(s) 212 that allow the system to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

System 200 also includes input devices 214 such as a keyboard, mouse, pen, voice input device, touch input device, etc. Output device(s) 216 such as a display, speakers, printer, etc. may also be included. All these devices are well known in the art and need not be discussed at length here.

A computing device, such as system 200, typically includes at least some form of computer-readable media. Computer readable media can be any available media that can be accessed by the system 200. By way of example, and not limitation, computer-readable media might comprise computer storage media and communication media, as described above.

Figure 3:
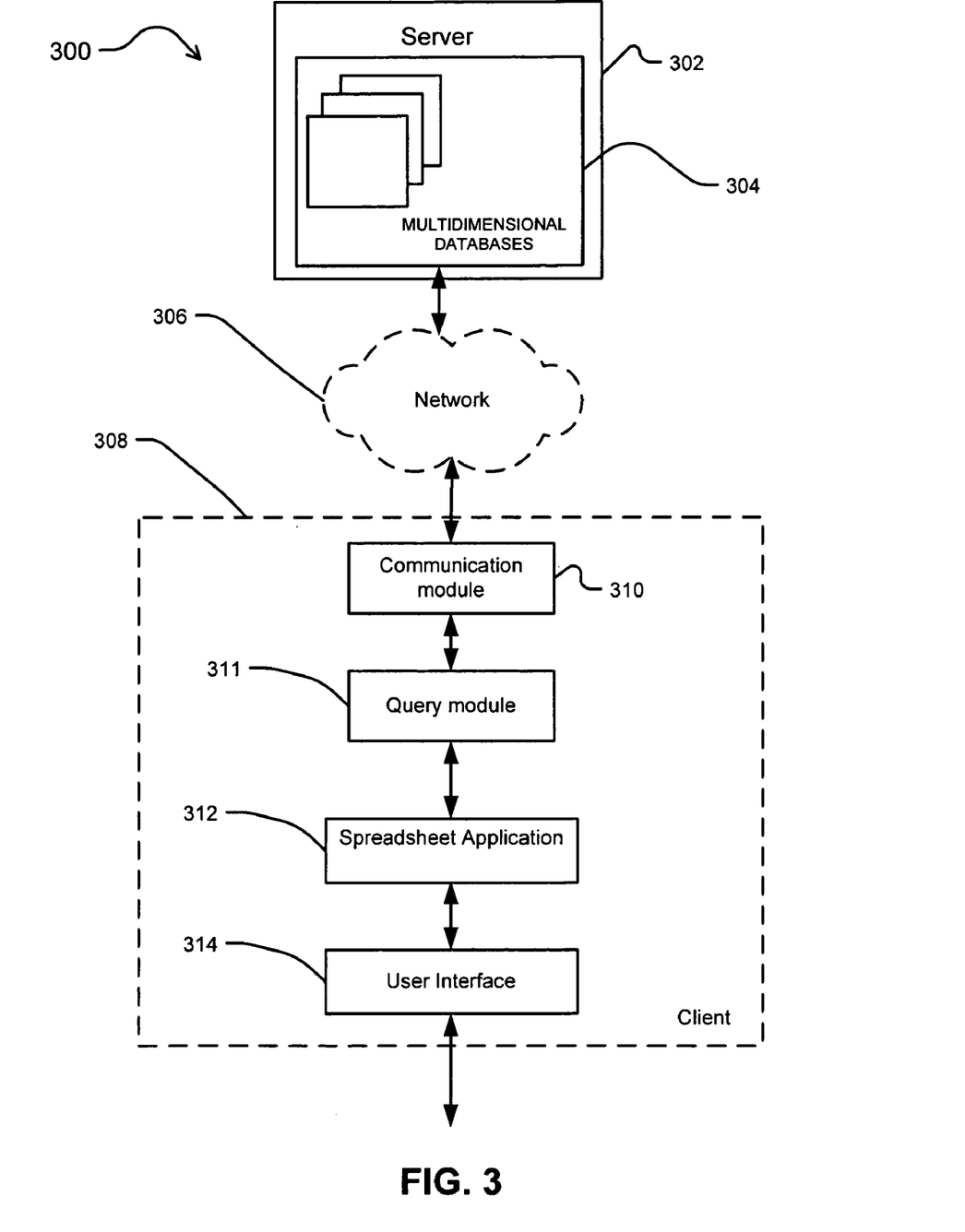
FIG. 3 illustrates a system for autocompleting entries in an active cell of a spreadsheet program from a preconfigured multidimensional database according to an exemplary embodiment.

FIG. 3 illustrates a system 300 for auto-completing entries in an active cell of a spreadsheet application, which is communicationally coupled to a database according to an exemplary embodiment. System 300 in this embodiment includes a server 302 which correspondingly has one or more databases stored thereupon 304. System 300 may optionally include a network 306 such as a LAN, WAN, the Internet or other network which server 302 may be coupled to.

System 300 in this embodiment also includes a client 308. Client 308 includes a communication module 310 communicationally coupled to a spreadsheet application 312. Furthermore, communication module 310 is coupled to the network 306. It should be appreciated that communication module 310 may also be directly coupled to server 302 and/or directly to database(s) 304.

When a user sets up a new spreadsheet in spreadsheet application 312, they may chose from a list of databases 304 that may be linked to. Alternatively, the user may type in the location of a database to be linked to. This link may then be given a label name, such that this name is used by a query module 311 to construct a query for the named database. Query module 311 is configured to receive the partial data entry and the name of the linked database, and then construct a query that will be passed on to server 302 (via communication module 310) to be interpreted. The database 304 is then queried and, in response to the query, returns suggested completed elements to the communication module 310. Communication module 310 then passes those suggested completed elements on to the spreadsheet application 312, which in turn passes the suggestions to user interface 314 for selection by the user.

Databases 304 may be multi-dimensional and/or OLAP-type databases, or other types of external data sources that can be linked to spreadsheet 312. Communication module 310 may be located on client 308, however it may also be included on server 302 or may be included in database(s) 304, among other locations. Communication module 310 is typically provided by database 304 such that the client 308 and spreadsheet application 312 may communicate with the database(s) 304. In one embodiment, communication module 310 may comprise a dynamic-link library (DLL) that is provided (and configured) by the particular linked database, or database type.

Query module 311 is shown in one embodiment as being separate from spreadsheet application 312. However, query module 311 may be included within the spreadsheet application 312. The location of query module 311 may also be other than in the client 308, such as within the server 302, or a remote location. The query module 311 allows suggested completed elements to be created and presented dynamically, rather than statically.

As databases 304 may be of different types and located in different locations, as well as have multiple dimensions, it may be difficult for a user to have thorough knowledge of the data labels, expressions, and/or dimensions, labels, coordinates of the various databases, data, metadata, and/or portions or combinations thereof. Therefore, autocompleting from a defined list of elements/data labels/dimension labels/dimensions/coordinates may be extremely helpful in that the user would not have to know beforehand all of the particular data labels or elements of all of the databases 304 needed to configure the spreadsheet application 312.

Figure 4:
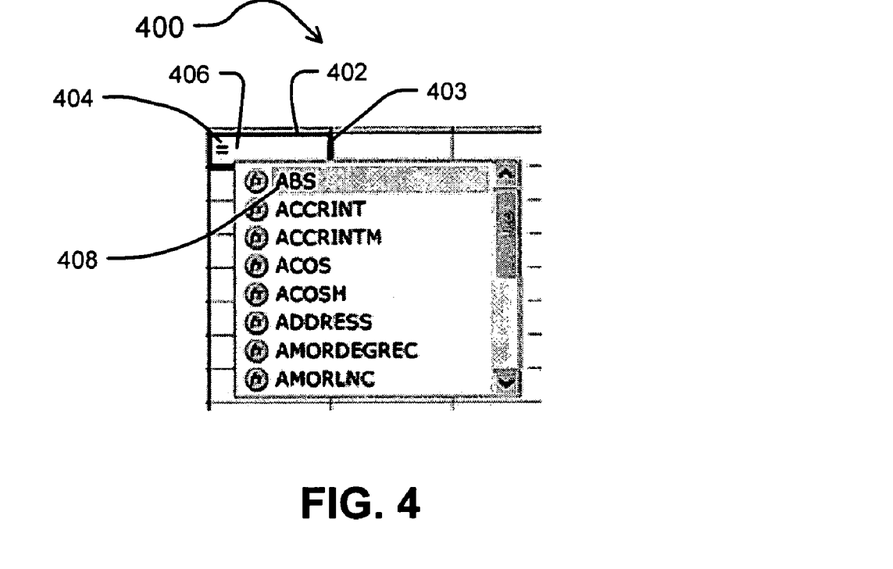
FIG. 4 depicts operational characteristics involved in autocompleting entries in a spreadsheet utilizing a database according to an exemplary embodiment.

FIG. 4 shows a portion of a spreadsheet 400, which includes a highlighted or activated cell 402, as delineated by the dark border 403 around the active cell 402. Within active cell 402, there may be an operand 404 as well as a partial data entry 406. Operand 404 may be a portion of the partial data entry 406. Corresponding to partial data entry 406 is a displayed list of elements 408 which have been returned via a query from a linked database. Elements 408 correspond to partial data entry 406, which are used along with the name of the link to the database to create the query for the linked database. In this example, all the suggested elements 408 are functions that may be used based upon the partial data entry 406, the type of spreadsheet, and/or the type and particular database linked to. In this manner, elements 408 are suggested based in part upon partial data entry 406. As the user enters more characters, new queries are created, and different suggested completed elements are returned. Consequently, the displayed suggested data list may change and/or may be reduced in size depending on the characters entered.

Figure 5:
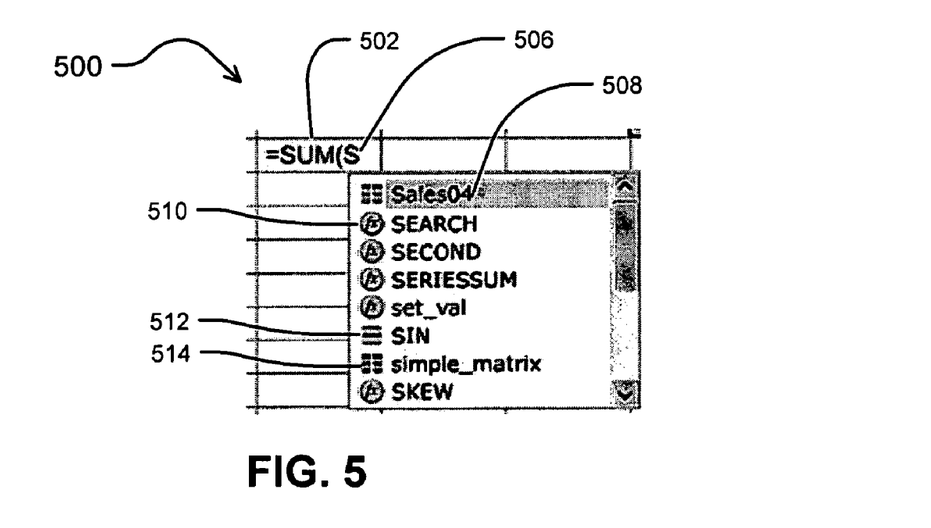
FIG. 5 depicts operational characteristics involved in autocompleting entries within an active cell of a spreadsheet utilizing a database according to an exemplary embodiment.

FIG. 5 shows a portion of a spreadsheet 500, which in this embodiment includes an active cell 502. Within active cell 502, may be a partial data entry 506. In this embodiment, partial data entry 506 includes the letter "s". And correspondingly elements from the linked database 508 corresponding to the letter "s", from within a database linked for this particular active cell 502. If user typed in another letter such as "e", that displayed list of elements 508 would change to only elements that begin with "se" such as "search", "second", "seriessum" and "set_val", as shown, etc. Furthermore, characters other than letters may be entered. For instance entering a "(" may indicate that the user may want to enter a command and/or a data label. In this instance commands, elements, and/or data labels may be displayed for the user, based upon the particular attributes of the linked database.

Along with suggested elements 508, indicators 510, 512, 514 may be included. Indicators 510, 512, 514 may indicate what type of element the suggested element 508 is. Indicator 510 indicates that the corresponding element directly to the right of it is a function that may be utilized based at least in part upon the partial data entry 506. Indicator 512 may indicate that the corresponding element is a dimension from the linked database. Indicator 514 may indicate that the corresponding element is a hierarchy or member from the linked database. Indicators 510, 512, 514 may enable a user to better, and more easily enter the appropriate element and more easily construct a spreadsheet.

Figure 6:
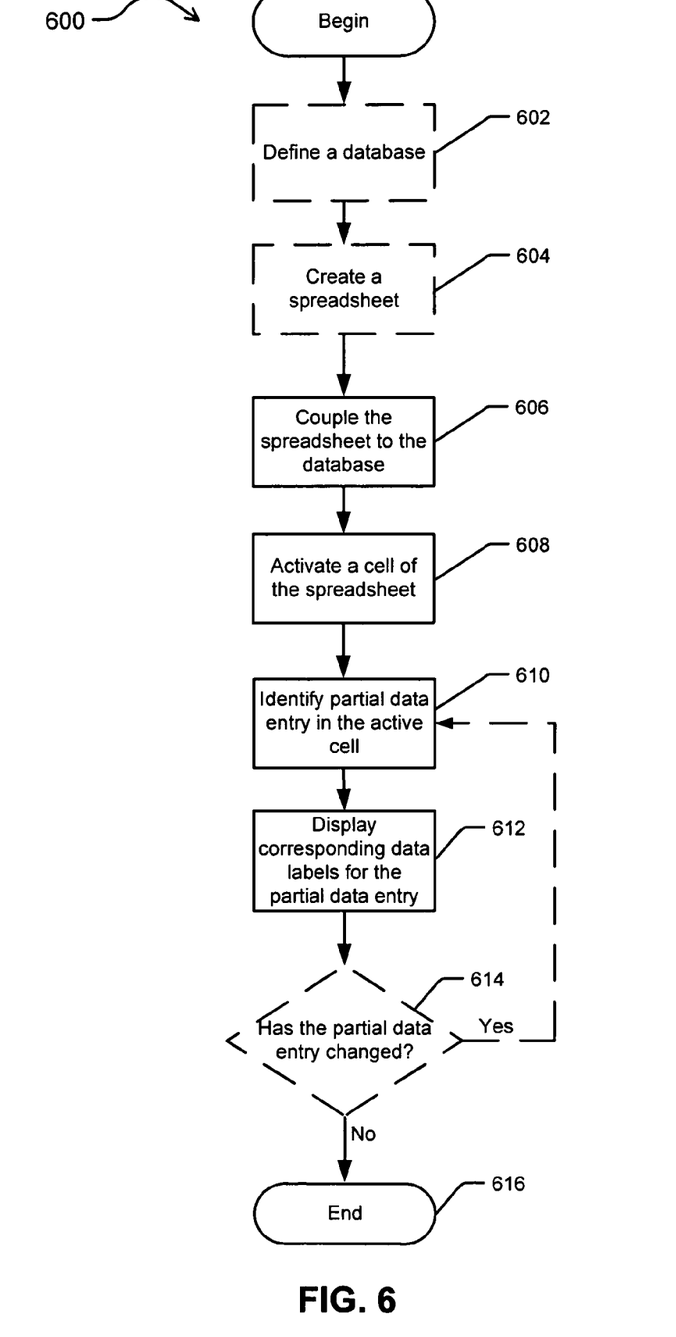
FIG. 6 is a flow diagram illustrating a method of autocompleting entries in a spreadsheet from a database according to an exemplary embodiment.

FIG. 6 displays an operational flow 600 incorporating aspects of the present invention. In an exemplary embodiment, flow 600 begins with define operation 602, which creates and defines a database. A database is defined or created when the particular coordinates are defined and saved, and the data fields populated. This step may be optional in that a user may link to databases that have already been created and defined.

Create operation 604 creates a spreadsheet. Create option 604 is also optional in that a spreadsheet may have already been created and/or opened such that a user may activate the edit mode of a cell to utilize the auto-complete function.

Once a database and spreadsheet have been created, the spreadsheet may link to and query the database. It should be appreciated that other types of application programs and/or databases may utilize this method to auto-complete the data labels, dimension labels, elements, and/or dimensions of any database for a user.

Next, operation 606 couples the spreadsheet to the database. When the spreadsheet is created and particular cells are defined within the spreadsheet, different databases may be linked to the information in that cell and/or spreadsheet, such that the spreadsheet autocomplete function would have a reference database to provide suggestions and/or display completed elements, etc. to the user. Once a link is created, each link may be identified or labeled. This link label may be utilized, along with the partial data entry in the active cell, to create a query. The query is to the linked database, and returns suggested completed elements in the form of a list that the user may select from. If the user selects or accepts a suggested completed element, it will be added to the existing string, if any, in the active cell. If the user then begins to add another data item, a new query will be created. Additionally the user may enter another type of command that may be acted upon by the system, such as a function, or if the user continues typing without accepting any of the suggested completions Once a spreadsheet is opened and is linked to a database, the user may employ an activation operation 608 to activate a cell of the spreadsheet. This may be accomplished in various ways including clicking on the cell, double clicking on the cell, and other methods such as using a keyboard to enter the edit mode for a cell in a spreadsheet or other application. In an embodiment, a dark border around the particular cell indicates the particular cell is activated. It will be appreciated that other methods for activating a cell and indicting an active cell may be utilized.

Following activation of a cell, identify operation 610 identifies a partial data entry within the active cell. This may include no entry, i.e. no characters entered into the active cell as the partial data entry. The partial data entry also may be letters, parentheses, a coma, bracket, and/or a "{", among other types of characters. The spreadsheet application then utilizes a query module to construct a query for the linked database. In one embodiment, the query module sends the query to a communication module. The communication module may be a data logic library (DLL) configured by the particular linked database or database type, as described above. The query is then sent to the database or database server that interprets the query and queries the database. The query then returns the suggested completed elements to the communication module. The suggested completed elements are then sent to the spreadsheet for selection/acceptance by the user. As the partial data entry changes, a new query will be created and executed to retrieve an updated list of suggested completed elements from the linked data source.

It will be appreciated that as the partial data entry changes, so will the elements that correspond to that particular partial data entry. The list of potential elements may be the defined data labels, dimensions, dimension labels, function, other elements, and/or coordinates that are based at least in part upon the partial data entry in the active cell. Furthermore, it should be appreciated that the list of potential elements may also include operands and/or other database descriptors or commands that provide possible matches for the partial data entry.

Following identification of the partial data item, display operation 612 displays the corresponding elements for the partial data entry on a user interface. As noted above, the corresponding elements are typically coordinates, functions, dimensions and/or data labels from the database linked to that particular cell and/or spreadsheet.

An optional decision 614 determines if the partial data entry has changed. If the user has changed the partial data entry, the "YES" leg is followed back to identify the new partial data entry at 610. A new query will be created and accomplished, and display operation 612 will update the display of the corresponding elements for selection by the user. If the partial data entry has not changed at 614, then the "NO" leg is followed to end the flow at 616.

Figure 7:
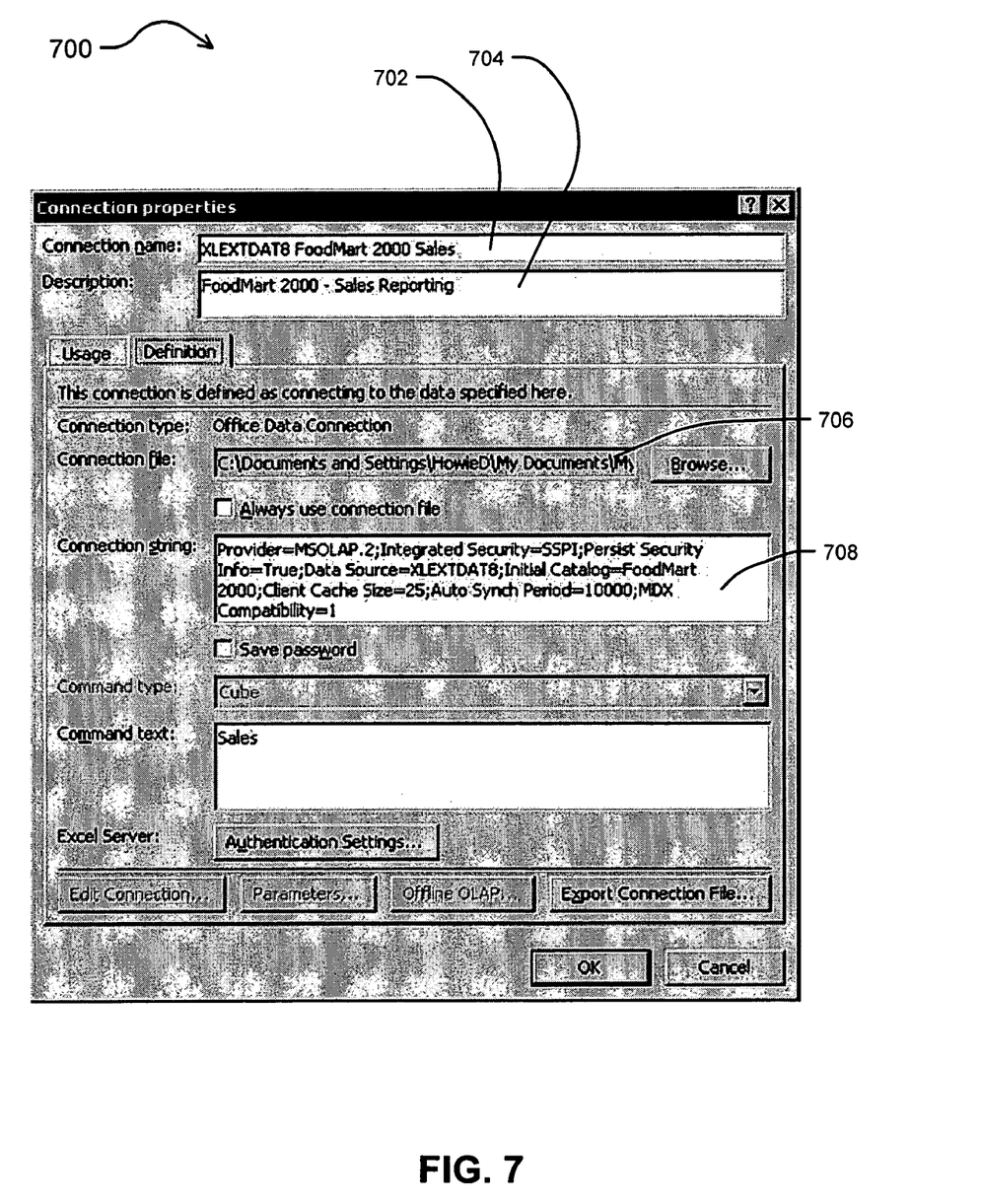
FIG. 7 illustrates a user interface for editing and defining a link to a data source according to an exemplary embodiment.

FIG. 7 illustrates a user interface 700 for editing and defining a link to a data source. Interface 700 may be one way to define the link between the application program and the data source. In this embodiment, interface 700 includes a connection name portion 702. Connection name portion 702 is configured to display and allow editing of the name/description of the connection or link. This name is used by the query module to identify and query the linked database.

Interface 700 also includes a description portion that allows editing and defining a description of the link. This description may include the data in the linked database, the linked database name, etc. This description may be used by the user to better describe the contents of the database, such that a spreadsheet is easier to understand and construct.

Interface 700 may also include a connection file portion 706. Connection file portion 706 allows easy identification (and editing) of the location of the connection file.

Interface 700 also includes a connection string portion 708. Connection string portion 708 displays the connection string for purposes of editing the string. The connection string may include a type of database linked to the spreadsheet (i.e. OLAP, SQL, etc.). It may also include a type of communication protocol, security features, etc. Many other types of data and definitions may be displayed and edited utilizing this interface.

The logical operations of the various embodiments of the present invention may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the exemplary embodiments described herein are referred to variously as operations, structural devices, acts or modules. It will be recognized by one skilled in the art that these operations, structural devices, acts and modules may be implemented in software, in firmware, in special purpose digital logic, and/or any combination thereof without deviating from the spirit and scope of the present disclosure as recited within the claims attached hereto.

Although the exemplary embodiments have been described in language specific to computer structural features, methodological acts and by computer readable media, it is to be understood that the exemplary embodiments defined in the appended claims are not necessarily limited to the specific structures, acts or media described. As an example, different formats other than MDX may be used to configure and/or access a database or other data source. Therefore, the specific structural features, acts and mediums are disclosed as exemplary embodiments implementing the claimed invention.

The various embodiments described above are provided by way of illustration only and should not be construed to limit this disclosure. Those skilled in the art will readily recognize various modifications and changes that may be made to the present disclosure without following the exemplary embodiments and applications illustrated and described herein, and without departing from the true spirit and scope of the present disclosure, which is set forth in the following claims.

What is claimed is:

1. A computer-implemented method for suggesting completion of partial data entries within an active cell in a spreadsheet, the computer-implemented method comprising:
   linking, by a computer, the spreadsheet to a plurality of multi-dimensional databases that are independent of the spreadsheet, wherein each of the plurality of multi-dimensional databases comprises a plurality of elements, wherein each element of the plurality of elements corresponds to an element type comprising one of: a dimension, a member, a function, and a hierarchy, wherein the linking comprises:
      communicatively coupling the spreadsheet to each of the plurality of multi-dimensional databases, and
      generating a unique link label for each of the plurality of multi-dimensional databases; and
   receiving a first partial data entry within the active cell, wherein the first partial data entry corresponds to a set of one or more first elements of the plurality of elements within at least one of the plurality of linked multi-dimensional databases;
   querying, by the computer, the plurality of linked multi-dimensional databases to identify the set of one or more first elements within the at least one of the plurality of linked multi-dimensional databases corresponding to the first partial data entry, wherein the querying of the plurality of linked multi-dimensional databases is performed as the user enters the first partial data entry within the active cell so that when a new character is added to the partial data entry a new query is executed, wherein queries to the multi-dimensional databases are formatted as multi-dimensional expressions (MDX);
   displaying, by the computer, on a display device the set of one or more first elements as a suggested completion for the first partial data entry, wherein an indicator is displayed adjacent each of the one or more first elements, wherein the indicator identifies an element type corresponding to each of the one or more first elements, and wherein a different indicator identifies each element type;
   receiving a modification to the first partial data entry within the active cell, wherein the modified first partial data entry corresponds to a different set of one or more first elements of the plurality of elements within at least one of the plurality of linked multi-dimensional databases;
   displaying, by the computer, on a display device the different set of one or more first elements as a suggested completion for the modified first partial data entry;
   receiving a selection of a first element of the different set of one or more first elements;
   storing the accepted first element within the first active cell;
   receiving a second partial data entry within the active cell, wherein the second partial data entry corresponds to a set of one or more second elements within at least one of the plurality of linked multi-dimensional databases;

querying, by the computer, the plurality of linked multi-dimensional databases to identify the set of one or more second elements within the at least one of the plurality of linked multi-dimensional databases corresponding to the second partial data entry;

displaying, by the computer, on the display device the set of one or more second elements as a second suggested completion for the second partial data entry, wherein an indicator is displayed adjacent each of the one or more second elements, wherein the indicator identifies an element type corresponding to each of the one or more second elements, and wherein a different indicator identifies each element type;

receiving a selection of a second element that is one of the set of one or more second elements; and adding the second element to a string comprising the first element in the active cell.

2. The computer-implemented method of claim 1, wherein the first element is a dimension-type element, the method further comprising:

responsive to the receiving a selection of the first element, the computer storing a matching dimension within the active cell.

3. The computer-implemented method of claim 1, further comprising:

the computer receiving a user-initiated command pertinent to the suggested completion;

the computer operating on the suggested completion in accordance with the user-initiated command; and when the user-initiated command contains a modified partial data entry, then the computer displaying on the display device a modified suggested completion that corresponds to the modified partial data entry.

4. The computer-implemented method of claim 1, wherein at least one of the plurality of linked multi-dimensional databases is an online analytical processing (OLAP) database.

5. A computer-implemented method for autocompleting a partial entry in a first active cell and a second active cell of a spreadsheet utilizing a plurality of preconfigured databases independent from the spreadsheet, wherein each of the plurality of preconfigured databases comprises a plurality of elements, wherein each element of the plurality of elements corresponds to an element type comprising one of: a dimension, a member, a function, and a hierarchy, the computer-implemented method comprising:

a computer linking the spreadsheet to the plurality of preconfigured databases to allow the spreadsheet to utilize data within the preconfigured database, wherein the linking comprises:

communicatively coupling the spreadsheet to each of the plurality of preconfigured databases, and generating a unique link label for each of the plurality of preconfigured databases;

defining the first partial data entry within the first active cell, the first partial data entry comprising a portion of one or more first elements of the plurality of elements in the plurality of preconfigured databases;

the computer querying the plurality of preconfigured databases to find the one or more first elements of the plurality of elements corresponding to the first partial data entry, wherein the querying of the plurality of preconfigured databases is performed as the first partial data entry is defined within the first active cell so that when a new character is added to the first partial data entry a new query is executed, wherein queries to the plurality of preconfigured databases are formatted as multi-dimensional expressions (MDX);

the computer displaying on a display device a set of the one or more first elements of the plurality of elements as a suggested completion for the first partial data entry, wherein an indicator is displayed adjacent each of the one or more first elements, wherein the indicator identifies an element type corresponding to each of the one or more first elements, and wherein a different indicator identifies each type;

receiving a modification to the first partial data entry within the active cell, wherein the modified first partial data entry corresponds to a different set of one or more first elements of the plurality of elements within at least one of the plurality of preconfigured databases;

the computer displaying on a display device the different set of one or more first elements as a suggested completion for the modified first partial data entry;

the computer receiving an acceptance command related to one of the displayed different set of one or more first elements;

the computer storing the accepted first element within the first active cell;

receiving a second partial data entry within the second active cell, wherein the second partial data entry corresponds to a set of one or more second elements of the plurality of elements within at least one of the plurality of preconfigured databases;

the computer querying the plurality of preconfigured databases to find the set of one or more second elements corresponding to the second partial data entry, wherein the querying of the plurality of preconfigured databases is performed as the second partial data entry is defined within the second active cell so that when a new character is added to the second partial data entry a new query is executed, wherein queries to the plurality of preconfigured databases are formatted as multi-dimensional expressions (MDX);

the computer displaying on a display device the set of one or more second elements as a suggested completion for the second partial data entry, wherein an indicator is displayed adjacent each of the one or more second elements, wherein the indicator identifies an element type corresponding to each of the one or more second elements, and wherein a different indicator identifies each element type;

the computer receiving an acceptance command related to one of the displayed set of one or more second elements of the plurality of elements;

the computer storing the accepted second element within the second active cell.

6. The computer-implemented method of claim 5, wherein the plurality of preconfigured databases are on-line analytical processing OLAP databases.

7. One or more computer storage media storing computer executable instructions that when executed perform a method for autocompleting partial entries in an active cell of a spreadsheet utilizing a plurality of preconfigured databases, wherein the plurality of preconfigured databases are independent from the spreadsheet, the method comprising:

linking the spreadsheet to the plurality of preconfigured databases to allow the spreadsheet to utilize data within the plurality of preconfigured databases, wherein each of the plurality of preconfigured databases comprises a plurality of elements, and wherein each element of the plurality of elements corresponds to an element type comprising one of: a dimension, a member, a function, and a hierarchy; wherein the linking comprises:

communicatively coupling the spreadsheet to the plurality of preconfigured databases, and     generating a unique link label for each of the plurality of preconfigured databases;

defining a first partial data entry within the active cell, wherein the first partial data entry corresponds to a set of one or more first elements of the plurality of elements in the preconfigured database;

querying the plurality of preconfigured databases to find the set of one or more first elements of the plurality of elements corresponding to the first partial data entry, wherein the querying of the plurality of preconfigured databases is performed as the first partial data entry is defined within the active cell so that when a new character is added to the first partial data entry a new query is executed, wherein queries to the plurality of preconfigured databases are formatted as multi-dimensional expressions (MDX);

displaying on a display device the set of one or more first elements of the plurality of elements corresponding to the first partial data entry as a suggested completion for the first partial data entry, wherein an indicator is displayed adjacent each of the one or more first elements, wherein the indicator identifies an element type corresponding to each of the one or more first elements, and wherein a different indicator identifies each element type;

receiving a modification to the first partial data entry within the active cell, wherein the modified first partial data entry corresponds to a different set of one or more first elements of the plurality of elements within at least one of the plurality of preconfigured databases;

displaying on a display device the different set of one or more first elements as a suggested completion for the modified first partial data entry;

receiving an acceptance command related to one of the displayed different set of one or more first elements of the plurality of elements;

storing the accepted first element within the active cell;

receiving a second partial data entry within the active cell, wherein the second partial data entry corresponds to a set of one or more second elements within the plurality of preconfigured databases;

querying the plurality of preconfigured databases to identify the set of one or more second elements corresponding to the second partial data entry;

displaying on a display device the set of one or more second elements as a suggested completion for the second partial data entry, wherein an indicator is displayed adjacent each of the one or more second elements, wherein the indicator identifies an element type corresponding to each of the one or more second elements, and wherein a different indicator identifies each element type;

receiving an acceptance command related to one of the displayed set of one or more second elements;

storing the accepted second element within the active cell.

8. The one or more computer storage media of claim 7, wherein the preconfigured database is an on-line analytical processing (OLAP) database.

9. The computer-implemented method of claim 1, wherein the second partial data entry is different from the first partial data entry.

10. The computer-implemented method of claim 1, wherein the second element is different from the first element.

11. The computer-implemented method of claim 5, wherein the second partial data entry is different from the first partial data entry.

12. The computer-implemented method of claim 5, wherein the accepted second element is different from the accepted first element.

13. The one or more computer storage media of claim 7, wherein the second partial data entry is different from the first partial data entry.

14. The one or more computer storage media of claim 7, wherein the accepted second element is different from the accepted first element.

\* \* \* \* \*